United States Patent [19]
Ducret

[11] Patent Number: 4,476,754
[45] Date of Patent: Oct. 16, 1984

[54] AUTOMATIC CABLE MEASURING AND CUTTING MACHINE

[76] Inventor: Lucien C. Ducret, 28 Lockwood Dr., Old Greenwich, Conn. 06870

[21] Appl. No.: 327,939

[22] Filed: Dec. 7, 1981

[51] Int. Cl.³ .............. B23D 45/02; B26D 5/40; B26D 7/18

[52] U.S. Cl. ................... 83/150; 83/208; 83/210; 83/222; 83/282

[58] Field of Search ............ 83/208, 210, 222, 221, 83/282, 277, 369, 150, 485, 487, 488

[56] References Cited

U.S. PATENT DOCUMENTS

| | | | |
|---|---|---|---|
| 1,856,169 | 5/1932 | Rosener et al. | 83/222 |
| 3,141,367 | 7/1964 | Keener et al. | 83/282 X |
| 3,251,253 | 5/1966 | Eubanks | 83/208 |
| 3,523,392 | 8/1970 | Carl | 83/208 X |
| 4,164,883 | 8/1979 | Jägers | 83/488 |
| 4,306,478 | 12/1981 | Stolzer | 83/488 X |

Primary Examiner—Frank T. Yost
Attorney, Agent, or Firm—Delio and Libert

[57] ABSTRACT

A machine for measuring and cutting predetermined lengths of electric cable such as armored (BX) or insulated cable which is supplied from a coil or reel to a "caterpillar" feed assembly and then to a cutting assembly, the feeding and cutting being synchronized and controlled to effect the cutting, automatically, of a predetermined number of pieces cut to predetermined uniform lengths, the controls including means for measuring the fed cable and for counting the number of pieces.

1 Claim, 11 Drawing Figures

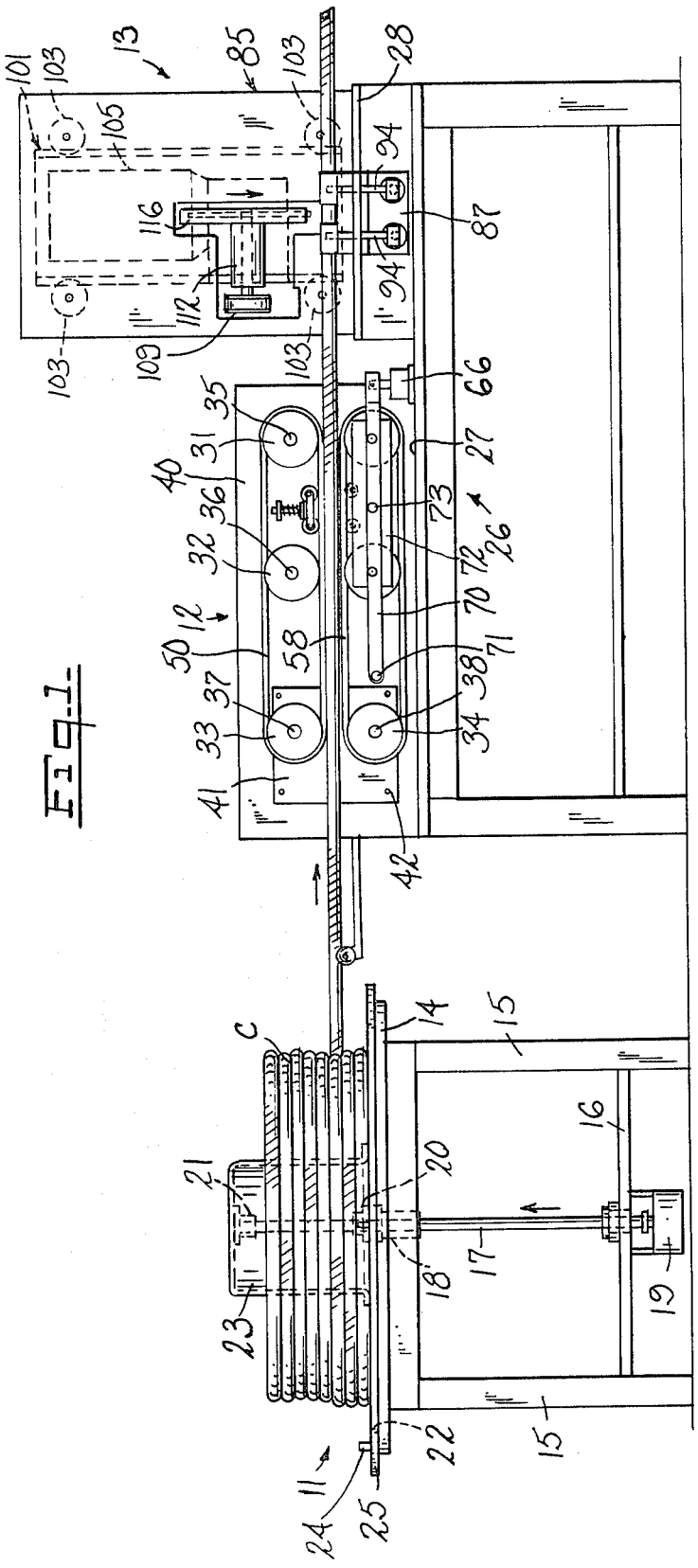
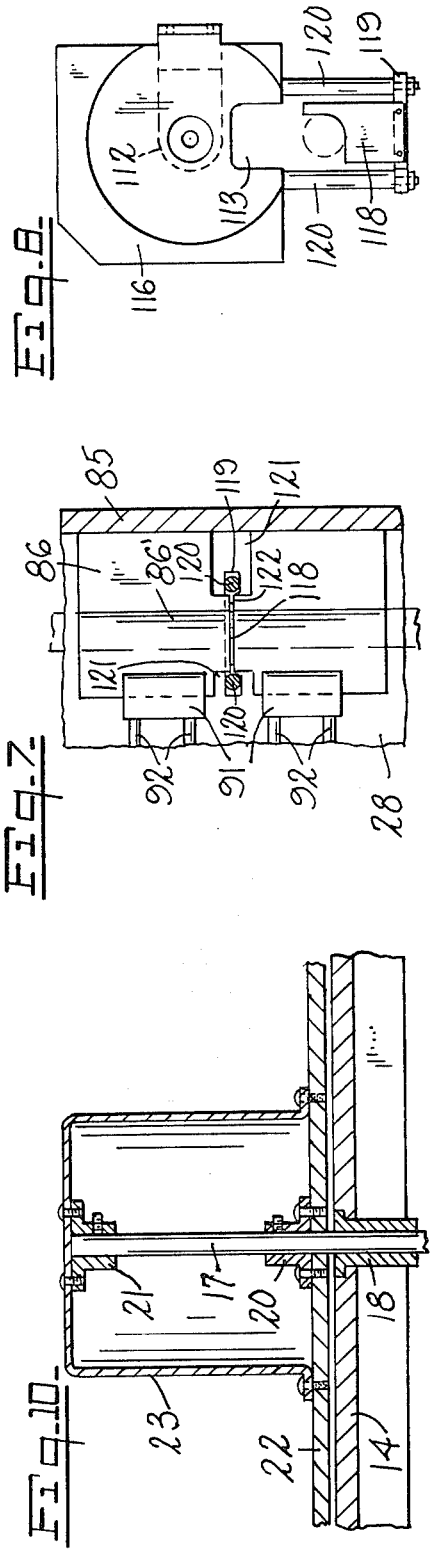

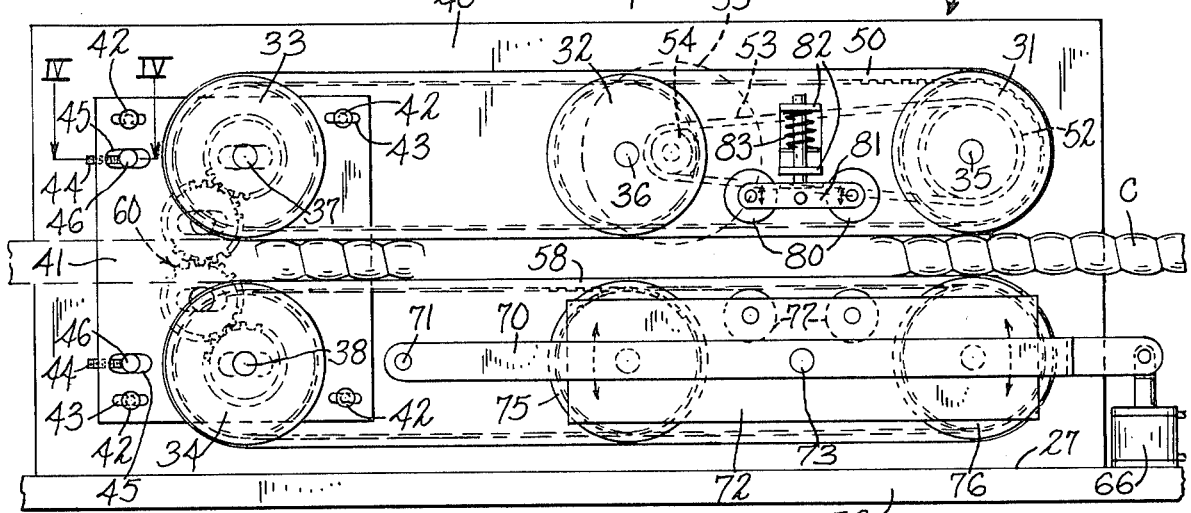

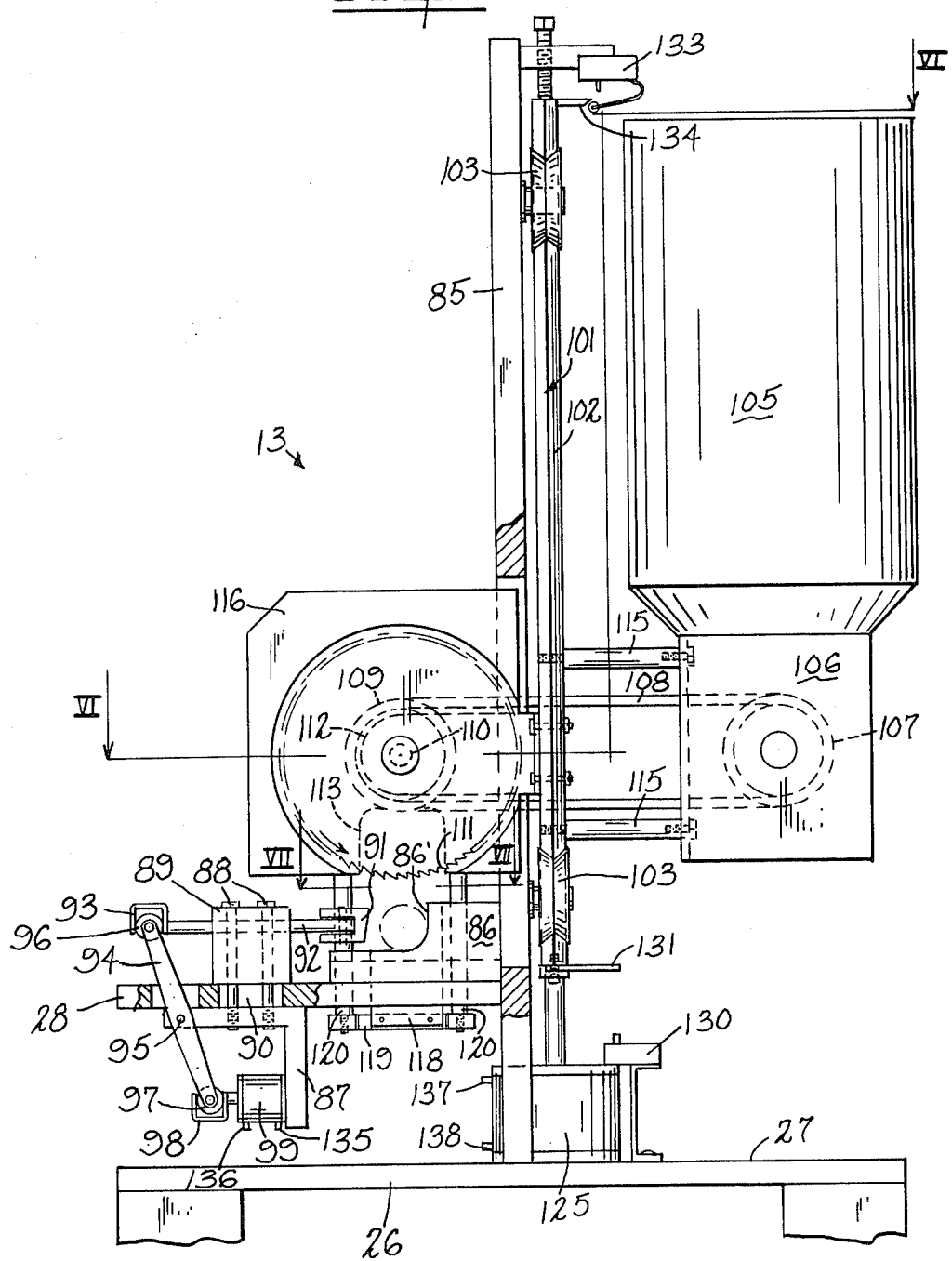

AUTOMATIC CABLE MEASURING AND CUTTING MACHINE

This invention relates to a machine which automatically measures and cuts predetermined uniform lengths of electric cable such as armored (BX) or insulated cable supplied from a coil or reel.

In certain industrial, manufacturing and/or electrical installation operations, it may be necessary to provide substantial numbers of uniformly measured and cut pieces of cable. Manual measurement with manual or mechanical cutting becomes arduous and impractical as the number of pieces increases, as can readily be appreciated.

A machine is known wherein the cable is fed through a "passive" one foot wheel counter and then rewound on a reel which is collapsible (for easy removal of the cable coil) and which may be driven by a variable speed motor. This machine is generally used to measure relatively long lengths of cable. Since the counter wheel is not motorized, the cable must be attached manually to the rewinding reel or wheel, making the system impractical for full automation.

It is accordingly an object of the invention to provide a substantially fully automated machine into which an uncut quantity of cable is introduced and out of which emerges a quantity of cable sections, cut to a uniform desired length.

As indicated, this machine is used to cut armored cable and the like to predetermined uniform lenghts. The machine is fully automatic. After the power is turned on and the cable is loaded in the machine, electronic counters are set to the length and number of pieces wanted. When the start button is pushed, the vertical saw is activated and a few inches severed off the beginning of the cable. Then a "caterpillar" drive, comprising upper and lower endless belts, advances the cable until an encoder has sent the number of pulses which activates an electronic counter to read zero. The drive stops, the saw restarts and moves down to cut the cable. The cycle repeats until the batch counter reaches zero. The machine can then be reset for cutting the cable to different lengths, if desired.

An important feature of the machine consists in the sophisticated caterpillar drive which insures maximum traction between a floating lower arm and small upper pressure rollers.

A practical embodiment of the invention is shown in the accompanying drawings, wherein:

FIG. 1 represents a side elevation of the machine, including feed table and a quantity of cable to be cut;

FIG. 2 represents a detail side elevation showing certain features of the "caterpillar" drive;

FIG. 3 represents a plan view of the portion of the machine shown in FIG. 2, parts being broken away and in section;

FIG. 4 represents a detail vertical section of the auxiliary plate adjusting means, taken on line IV—IV of FIG. 2;

FIG. 5 represents an end elevation of the machine, from the delivery end;

FIG. 7 represents a detail horizontal sectional view on the line VII—VII of FIG. 5;

FIG. 8 represents a detail elevation of the "slot filler" assembly;

FIG. 9 represents a plan view of the cable supply table;

FIG. 10 represents a detail vertical section on the line X—X of FIG. 9 illustrating the bearing assembly for the cable supply table.

Figure 6:
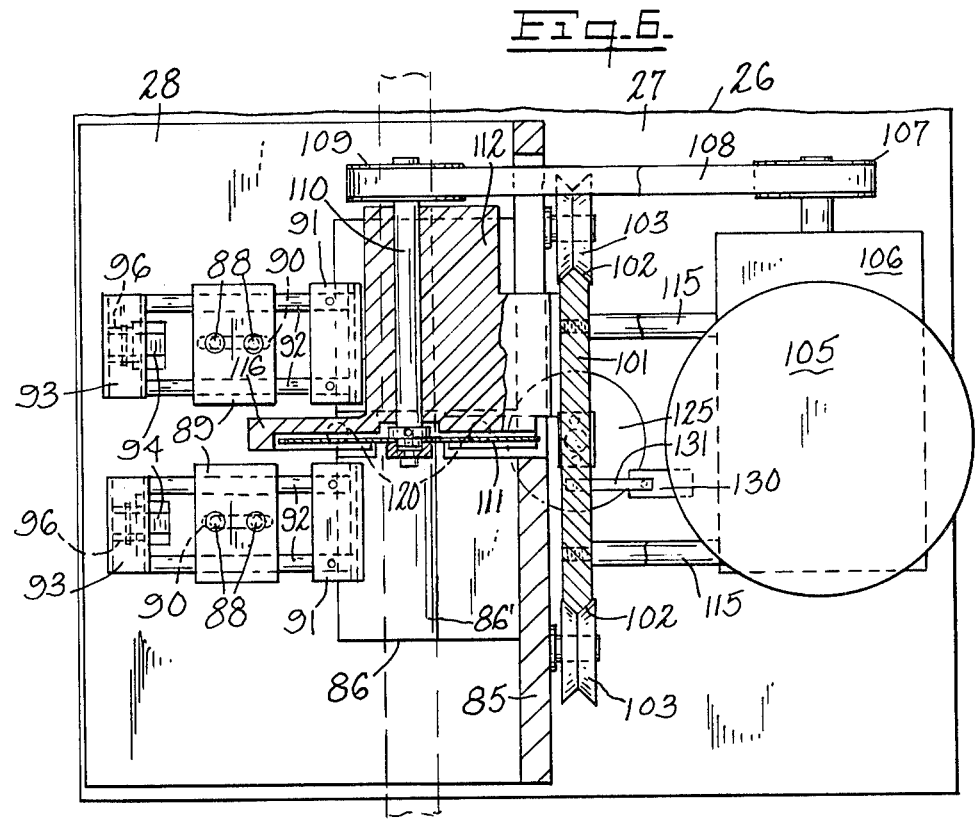
FIG. 6 represents a horizontal section on the line VI—VI of FIG. 5.

As shown most inclusively in FIG. 1, the complete machine comprises three separate but cooperating units, namely, the supply and pay-off table 11, the "caterpillar" cable feed assembly 12 and the cable cutting assembly 13.

The supply table 11 comprises a round flat table 14 of steel or the like supported by four legs 15 which are connected near their lower ends by a spreader 16. A vertical axle 17 is journaled in the center of the table at 18 and supported by the piston of an air cylinder 19 mounted beneath the spreader. At its upper end, the axle is engaged by fittings 20, 21 the lower of which is fixed in the center of the circular platform 22. A cylindrical turret 23 is mounted in the center of the platform and secured to the top of the axle 17 by the upper fitting 21, the turret being proportioned to fit freely within a loose coil of cable C so as to distribute the weight of the coil on the platform around the axis of the axle 17. The platform can turn freely when it is lifted off the table top by actuation of the cylinder 19, as described below, while its rotation is braked frictionally by contact with the table top when not lifted therefrom. When at rest on the table top, the surface of the platform is flush with the surface of the table extension 25 which may suitably be provided with one or more short vertical pins 24, for interim control of loose cable, i.e. before its introduction into the feed assembly.

The "caterpillar" cable feed assembly 12 and the cable cutting assembly 13 may conveniently be supported by an elongated table or bench 26 which has flat surface 27 at one height, for the feed assembly, and a higher flat plate 28 for the cutting assembly.

In the cable feed assembly 12, the rollers 31, 32, 33 and 34 are flanged rollers, carried by shafts 35, 36, 37 and 38, respectively, the shafts 35 and 36 being journaled in the vertically mounted main feed frame plate 40.

The shafts 37, 38 are journalled in the auxiliary plate 41 which is mounted on plate 40, as clearly shown at the left of FIG. 2, by bolts 42 passing through horizontal slots 43. This permits horizontal adjustment of the plate 41 relative to the plate 40, under the control of the set screws 44, projecting into the separate slots 45 from the edge of the plate 41 to bear against pins 46 as shown in FIGS. 2 and 4.

The belt 50 is a toothed belt engaging with corresponding teeth on the surfaces of the rollers 31, 32 and 33. The shaft 35 of roller 31 passes through the plate 40 and is connected by the toothed pulley 52 and belt 53 to the pulley 54 of a variable speed drive assembly indicated generally at 55. The shaft 35 is also connected by an adjustable mechanical friction drive 56 to the encoder 57.

The drive 56 comprises conical rollers 58, 58', engaged by the adjustable roller 59, adjustment of which varies the speed of roller 58' relative to the speed of the roller 58. The shaft of roller 58' is connected to the encoder 57 (a pulse switch or mechanical counter), so that, for a particular setting of the roller 59, e.g. for ten feet, roller 58' must rotate exactly ten times (one foot per rotation) or send exactly ten pulses to an electronic counter. This system thus works backward by keeping the output at a constant predetermined length while varying the input on the number of rotations of the belt roller 31, through the conical rollers 58, 58' and adjustable roller 59. The circumference of roller 31 is thus not critical since, for instance, to move the cable exactly 10 ft. may require 12 turns of roller 31. Wear of driving belt 50 can be compensated or the system can be adjusted for cables with different stretch characteristics by physically measuring the finished product until the right dimension is reached. Standard measuring systems use a one foot circumference wheel. Motor 55 can be equipped with a magnetic or pneumatic brake or connected to a variable speed drive to insure soft start and stop motion. The counters (57) are equipped with a relay which opens to stop the motor or slow down the variable speed drive.

Roller 34 is driven from roller 33 by means of the gear train 60, the shafts of which are journalled in plate 41 and pass through slots or the like in plate 40 with sufficient clearance to permit adjustment of the plate 41 as needed to regulate the belt tension.

A double lever 70, one end of which is pivotally mounted at 71 on the plate 40, provides support for the cage 72 which is pivoted centrally at 73 to the lever 70 and supports the axles of the rollers 75 and 76. The free end of the double lever 70 is biased in an upward direction by the air cylinder 66, so that the belt 58 on rollers 34, 75 and 76 can be brought to bear on the cable with a force sufficient to provide adequate traction for the cable C between belts 50 and 58. Two small additional rollers 77 are also journalled in the cage 72 with their upper surfaces on the line between the upper surfaces of rollers 75 and 76, thus providing level support for the belt 58 and cable C in this zone, while irregularities can be compensated for by the possible rocking of the cage around its pivoting axis 73.

Opposite (above) the rollers 77 are two similar rollers 80, mounted on a carriage 81 which is carried by a bracket 82 on the plate 40 and spring loaded by spring 83 to bear resiliently against the lower run of the upper belt 50.

The cable cutting assembly 13, shown at the right of FIG. 1 with additional views in FIGS. 5, 6, 7 and 8 is supported by the horizontal frame plate 28, which is somewhat elevated above the table surface 27, and is mounted on a vertically disposed supporting plate 85. The anvil block 86, having a curved cable-receiving surface 86' is fixed on the upper surface of plate 28, at its juncture with plate 85, and an angle bracket 87 is supported beneath the plate 28 by screws 88 which pass through a block 89 on the upper surface of the plate 28 and through slots 90 in said plate. The block 89 and bracket 87 can thus be adjusted in the direction of the length of said slots, as explained below. The block and bracket support a double vise assembly which comprises a pair of jaws 91 having slanted working faces, each jaw being mounted on a shaft 92 journaled in the block 89 and being equipped at its other end with a roller retainer 93. The levers 94 are centrally pivoted at 95 to the bracket 87, with rollers 96, 97 at their upper and lower ends, the upper rollers being received in the roller retainers 93 and the lower rollers being received in similar roller retainers 98 mounted on the pistons of a pair of double acting pneumatic or hydraulic cylinders 99.

The vise assembly just described can accommodate automatically differences in cable diameter of ¼"; for greater variations, the whole assembly can be moved toward or away from the cable position by loosening the screws 88 and sliding the bracket 87 and block 89 within the limits of the slots 90.

The saw and motor assembly is carried on a vertical plate 101 which has parallel double beveled side edges 102, adapted to be guided by V-grooved rollers 103, in accordance with the disclosure of U.S. Pat. No. 3,661,431. The rollers are mounted on the supporting plate 85. The saw and motor assembly includes the motor 105, connected to a right angle speed reducer 106 driving a pulley 107. The belt 108 connects pulley 107 with a pulley 109 on the shaft 110 of the circular saw 116 which is journaled in a block 112 bolted to the face of the plate 101. The belt 108 and a portion of the block 112 pass through a cut-out 113 in the supporting plate 85, with sufficient clearance to permit the necessary limited vertical movement of the saw and motor assembly. The connection of the speed reducer 106 to the plate 101 includes parallel horizontal spacers 115. The saw blade 111 is protected by a blade guard 116 which envelopes most of the periphery of the blade, for maximum protection, with a cut-out just large enough to permit free passage of the saw through the largest cable for which the machine is designed.

A special feature of the saw assembly is the "slot filler" which comprises a piece of hardened steel 118 having the exact thickness of the saw blade, the slot filler being mounted on a shot bar 119 carried by a pair of rods 120 which extend downward from the blade guard 116 and are movable vertically in channels 121 at each end of a slot 112 extending vertically through the block 86 in the plane of the saw cut. The slot filler is shaped to the profile of the anvil surface 86' and is adjusted to a position such that its edge lies exactly in register with that profile when the saw blade is in its elevated position. During the downward (cutting) movement of the saw, the slot filler moves downward and debris from the cut cable tends to drop into the slot 122; when the saw retracts upward the slot filler moves correspondingly and clears the entire slot because its profile is exactly that of the anvil block 86 and its surface 86'.

At the delivery end of the cutting assembly (at the right in FIG. 1) the cut lengths of cable can be collected in any manner appropriate to their length.

The cut pieces of cable may, for instance, be dropped into a movable bin on casters by which they are conveyed to a stripping station where two machines of the type shown in Ducret U.S. Pat. No. 4,055,097 are set up in positions suitable for stripping both ends of each piece simultaneously. The cable pieces are rewound manually on a collapsible wheel, tied and equipped (at another station) with electrical connectors at each end, if required. Alternatively, the machines of Ducret U.S. Pat. Nos. 4,103,578 or No. 4,169,400 could be used to strip the cable ends.

Figure 11:
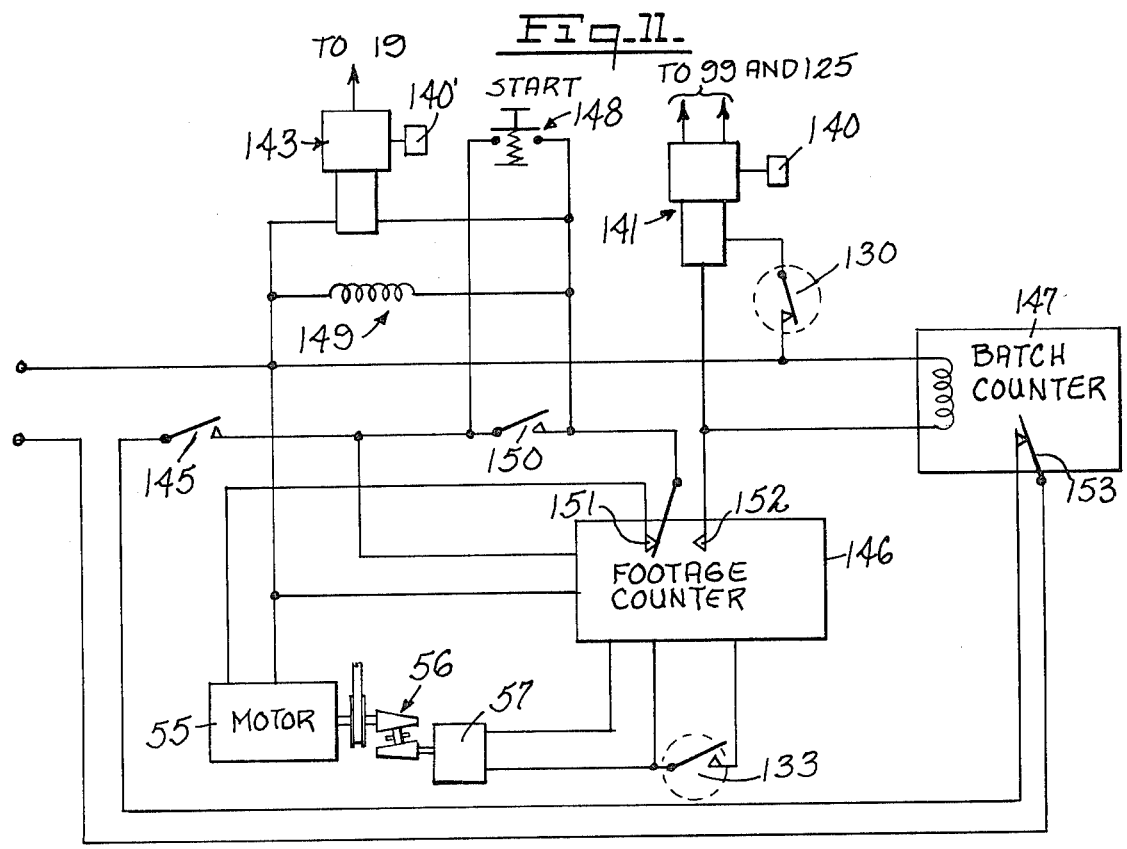
FIG. 11 is a schematic wiring diagram showing the major features of the automatic controls for the machine.

As parts of the control system, shown schematically in FIG. 11, there are shown in FIG. 5, a first limit switch 130 adjacent to the cylinder 125 which effects vertical movement of the plate 101 on which the saw is mounted. A trip finger 131 at the bottom of the plate actuates the switch at the low position of the saw. A second limit switch (one way) 133, mounted at the top of the plate 85, is actuated by the trip finger 134 carried by the plate 101, when said last named plate reaches its upper position.

The cylinders 99 and 125 receive air through conduits (not shown) which are connected at 135, 136 and 137, 138, respectively, from the air supplies 140 (FIG. 11) under the control of the latching solenoid assembly 141.

The encoder 57 (FIG. 3) operated by adjustable friction drive 56 is connected to the footage counter.

The cable supply cylinder 19 receives air from the air supply 140′ (which may be the same as 140) under the control of the solenoid valve assembly 143.

Further on the operation of the machine, in accordance with the schematic of FIG. 11, when on-off switch 145 is closed, power is supplied to the electronic footage counter 146, the display is set to the footage desired, and the batch counter 147 is set to the number of pieces desired.

The start switch 148 is depressed, latching relay coil 149 through the contact 150 which starts the motor 55 driving the cable feeding mechanism and actuation cylinder 19 to lift the cable pay-off reel. The motor 55 also drives a rotary pulse switch 57 which activates descending numbers on the display. (When the number reaches zero, the contacts 151 in the footage counter are opened, stopping the motor and pay-off table).

Solenoid valve 141 is actuated through the closing of the contact 152 in the footage counter, to cause cylinder 99 to clamp the cable on its anvil and cylinder 125 to lower the saw blade onto and through the cable. This also actuates the batch counter and subtracts one number from the display. When limit switch 130 is activated, the solenoid valve 141 is unlatched, switching air to cylinders 99 and 125 through conduits 136 and 138 which return the cylinders to starting position; switch 133 is also temporarily closed to reset the footage counter and restart the cycle. When the batch counter 147 reaches zero, contacts 153 are opened and relay coil 149 unlatches opening contacts 150 to stop the machine.

For the sake of simplicity, some relatively conventional features are not shown. For instance, the motor may be of the variable speed type or a variable speed drive may be inserted between the motor and the gear train 60 to permit soft starts and stops. The soft stops can be controlled by the footage counter, sending a "pre-warn" signal to slow down the motor before the counter reaches zero. It is also advisable to provide a brake for the caterpiller drive to prevent any accidental motion when the drive is stopped.

If the cable supply runs out, the power is automatically cut off, as by a limit switch (not shown) on the cylinder 66. When a new cable is to be inserted between unloaded caterpillar belts, the air pressure in cylinder 66 can be momentarily released by means of a push button (not shown), to permit lowering of the lower belt. The on/off switch 145 may also control the motor 105, or a separate power line and switch can be provided.

The overall precision attainable with the measuring and cutting machine disclosed herein is found to be within 1% of the set length, which is considered to be excellent in view of the known "springiness" of BX cable, for instance.

It will thus be seen that the objects set forth above, among those made apparent from the preceding description, are efficiently attained and, since certain changes may be made in the above constructions without departing from the spirit and scope of the invention, it is intended that all matter contained in the above-description or shown in the accompanying drawings shall be interpreted as illustrated and not in a limiting sense.

What I claim is:

1. An automatic cable measuring and cutting machine comprising:

means for supplying a continuous length of cable to be cut, a circular saw adapted to sever from the continuous length of cable a predetermined shorter length of cable, a cable feeding means adapted to receive cable from the supplying means and transport the cable to the saw, a channeled anvil located adjacent the saw and provided with a slot to permit passage of the saw blade, a vise assembly for holding a cable against the anvil, a slot filler movable into and out of the slot in the anvil, whereby debris from a cable cutting operation may be removed from said slot, driving means for actuating the saw and the cable feeding means, means for causing actuation of the saw, and means for causing actuation of the cable feeding means.

* * * * *